United States Patent [19]

Eilerman et al.

[11] 4,147,833

[45] Apr. 3, 1979

[54] GLASS FIBER COATING COMPOSITION

[75] Inventors: George E. Eilerman; Albert E. Tamosauskas, both of Pittsburgh, Pa.

[73] Assignee: PPG Industries, Inc., Pittsburgh, Pa.

[21] Appl. No.: 852,116

[22] Filed: Nov. 16, 1977

Related U.S. Application Data

[60] Division of Ser. No. 801,171, May 27, 1977, Pat. No. 4,074,988, which is a continuation of Ser. No. 637,341, Dec. 3, 1975, abandoned, which is a continuation of Ser. No. 512,648, Oct. 7, 1974, abandoned, which is a continuation-in-part of Ser. No. 348,876, Aug. 2, 1973, abandoned.

[51] Int. Cl.$^2$ ............................................. C08L 7/00
[52] U.S. Cl. ................................... 428/378; 65/3 C; 260/29.2 N; 260/29.7 T; 260/29.7 UA; 260/29.7 NR; 428/375; 428/435
[58] Field of Search .................. 428/397, 378; 65/3; 260/23, 29.2 N, 856, 29.7 T, 29.7 UA, 29.7 NR

[56] References Cited

U.S. PATENT DOCUMENTS

| | | | |
|---|---|---|---|
| 3,116,192 | 12/1963 | Eilerman | 156/167 |
| 3,254,042 | 5/1966 | Cogswell | 260/23 |
| 3,666,723 | 5/1972 | Kray et al. | 428/378 |
| 3,718,449 | 2/1973 | Fahey | 65/3 C |
| 3,852,051 | 12/1974 | Fahey | 428/378 |
| 3,853,605 | 12/1974 | Fahey | 428/378 |
| 3,876,405 | 4/1975 | Eilerman | 65/3 |

*Primary Examiner*—George F. Lesmes
*Assistant Examiner*—E. Rollins Buffalow
*Attorney, Agent, or Firm*—Kenneth J. Stachel; Alan T. McDonald

[57] ABSTRACT

Individual glass fibers are coated with a composition which includes the condensation product of a polycarboxylic acid or anhydride and a polyfunctional amine. The preferred coating composition, comprises an aqueous mixture including the aforementioned condensation product and an elastomeric styrene-butadiene-vinylpyridine terpolymer latex. An aqueous solution of the coating composition is prepared and applied to glass fibers as a sizing composition and/or as a coating composition after the glass fibers are sized. Subsequent to coating the glass fiber strands with the aforementioned coating composition, the strands are dried by heating in a microwave oven, a forced air oven or the like.

5 Claims, No Drawings

GLASS FIBER COATING COMPOSITION

CROSS-REFERENCE TO RELATED APPLICATIONS

This application is a division of application Ser. No. 801,171, filed May 27, 1977, now U.S. Pat. No. 4,074,988 which is a continuation of application Ser. No. 637,341, filed Dec. 3, 1975, now abandoned, which is a continuation of application Ser. No. 512,648, filed Oct. 7, 1974, now abandoned, which is a continuation-in-part of application Ser. No. 384,876, filed Aug. 2, 1973, now abandoned.

BACKGROUND OF THE INVENTION

This invention relates to coating compositions for glass fibers and more particularly to an aqueous coating composition that includes the condensation product of a polycarboxylic acid or anhydride and a polyfunctional amine for coating glass fibers for use in reinforcing elastomeric products.

It has long been recognized that glass fibers should make an ideal reinforcement for automobile tires (U.S. Pat. No. 2,184,326), rubber timing belts (U.S. Pat. No. 2,135,057) and other rubber or rubberlike materials. In preparing glass fibers for such applications, glass fibers in the form of strands, yarn, roving or fabric are coated with an adhesive to aid in bonding of the glass to elastomeric material. By far the most widely used adhesive for preparing glass fibers for reinforcing rubber or rubberlike materials is a resorcinol-formaldehyde resin with an elastomeric latex. The resorcinol-formaldehyde resin is generally applied to glass fiber material prior to molding of the reinforced article by contacting a glass fabric, strand, yarn or the like with an aqueous latex mixture having the resorcinol-formaldehyde resin dispersed therein. Largely because of its high cost a satisfactory substitute for all or part of the resorcinol-formaldehyde resin has long been sought. Additionally the resorcinol-formaldehyde resin latex mixture is difficult to apply to glass fabric in a manner whereby the resin may thoroughly impregnate and coat the glass fibers which form the fabric. Therefore uncoated glass fiber strands often times remain in the fabric after being contacted with the resinous mixture. These strands are subject to glass on glass abrasion which soon destroys the long strands of glass and renders its reinforcing properties unsatisfactory. Further, resorcinol-formaldehyde resins in aqueous solution, over a long period of time, and when subjected to both ambient and superambient temperatures, have a tendency to further polymerize thereby changing the chemical and physical properties of the coatings formed therefrom.

It has been proposed that glass fiber materials be coated while being formed with a rubber adhesive in order to insure complete coating of a glass fiber with coating materials. For example, a glass fiber strand composed of a multitude of individual fine glass fibers or filaments formed by being drawn from a molten cone of glass located at the tips of small orifices in a bushing such as shown in U.S. Pat. No. 2,133,238 are contacted with a bath containing the adhesive material. However, difficulty has been encountered in coating glass fibers in this manner because the adhesive resorcinol-formaldehyde latex mixture remains tacky after application and drying and interferes with subsequent twisting, winding and spinning operations performed on the glass fibers to form roving, yarn, fabric and the like.

In a typical two-step operation glass fibers formed as described above are coated while moving at a high speed with the sizing composition containing a glass binder and lubricant to yield a strand comprising a multitude of individual glass filaments having sufficient integrity for workability in formation into yarn or the like. After the size has been applied to the glass, a number of strands in parallel form are coated with the coating composition, dried and then wound on a tubular support to form glass fiber roving which may then be formed by twisting, spinning or weaving into yarn fabric or other forms suitable for use as reinforcement for elastomeric products.

By sizing composition, as opposed to a coating composition, is meant a composition for coating glass fibers useful for reinforcing rubber and rubberlike materials characterized by a weight gain of glass fiber material when subject to a sizing treatment of about 0.5 to 2 percent based upon dry glass as opposed to a weight gain of about 15 to 40 percent based upon dry glass in a coating application wherein a rubber adhesive is applied to the glass fiber material.

A sizing composition or size is usually an aqueous dispersion including the addition of a lubricant, a coupling agent or finished material. The coupling agent or finished material renders the surface of the glass fibers compatible with the resin with which they are to be employed in preparing a glass fiber reinforced elastomeric product and aids in bonding the fibers thereto.

U.S. Pat. No. 3,718,448 entitled "Fiber Forming and Coating Process" by Warren W. Drummond and Donald W. Denniston assigned to the assignee of this invention discloses apparatus for applying a combined sizing and coating composition to individual glass fibers and then drying the fibers in strands and collecting the dried strands on a forming tube. By this process the glass fibers are simultaneously coated with both the sizing and coating in a single coating step that reduces substantially the time and equipment required to process the glass fibers for use as a reinforcement in elastomeric products. The combined sizing and coating composition previously employed with this process included only resorcinol-formaldehyde as the resin constituent. There is a need therefore for a coating composition and/or a combined sizing and coating composition that may be more economically prepared and applied to the glass fibers and has increased stability over the conventional resorcinol-formaldehyde based adhesive compositions.

SUMMARY OF THE INVENTION

This invention provides novel coating compositions for preparing glass fibers for use in reinforcing elastomeric products. The invention provides novel coating compositions for glass fibers permitting improved impregnation of a glass fiber strand composed of a multiplicity of individual glass filaments with rubber adhesive. Additionally there are provided combined sizing and coating compositions for glass fibers enabling the application of sizing and adhesive chemicals to a glass fiber strand in a single-step application.

The invention provides a coating composition for glass fibers for use in reinforcing elastomeric products wherein the condensation product of a polycarboxylic acid, or an anhydride or a polyanhydride, and a polyfunctional amine is a major constituent. A typical combined sizing and coating composition comprises an aqueous mixture of the abovementioned condensation product and an elastomeric latex particular styrenebutadiene-vinylpyridine terpolymer rubber latex. The rubber adhesive portion of the coating composition comprises generally the polycarboxylic acid or anhydride or polyanhydride-polyfunctional amine condensation product which is soluble in aqueous ammonia. This condensation product may be employed in admixture with the remaining ingredients to form a material useful for both sizing and coating glass fibers in a single application as the glass fibers are formed and drawn. The procedure involving both the sizing and coating procedures in a single step is more fully disclosed in U.S. Pat. No. 3,718,449. Alternatively the rubber adhesive portion together with the latex portion may be applied to a previously sized glass fiber in the form of strands or yarns in a subsequent application step.

In addition to the rubber adhesive and latex composition described above, a silicone coupling agent may be employed to aid in the bonding of the adhesive composition to the glass fibers. Preferably the coupling agent is an amino silane type coupling agent having the general formula:

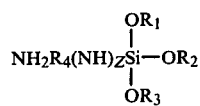

or a uredo silane coupling agent having the general formula:

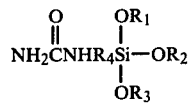

wherein $R_1$, $R_2$ and $R_3$ are the same or different and are selected from the lower alkyl or aliphatic monovalent hydrocarbon radicals having less than 8 and more preferably less than 5 carbon atoms. $R_4$ is a divalent alkylene radical having less than 8 carbon atoms, and Z is either 1 or 0. The coating composition and/or the combined sizing and coating composition is employed at a level of about 15 to 40 percent by weight of the dried residue of the coating composition as a weight gain on the initial glass fibers.

The following example is illustrative of a coating composition and/or combined sizing and coating composition according to the invention which may be used in the coating procedure more fully described in U.S. Pat. No. 3,718,449 (the single-step process) for applying the coating and sizing ingredients to the glass fiber materials for preparing glass fibers for reinforcing elastomeric products. Glass fibers may be contacted with the coating composition as a combined sizing and coating composition as they are formed. Preferably the glass fibers are contacted with a composition within a few feet of the bushing and cone from which they are being drawn as previously referred to in U.S. Pat. No. 3,718,449. The combined sizing and coating composition described hereinafter and other compositions of the invention may also be applied by conventional roller applicators such as described in U.S. Pat. No. 2,873,718 or in the case of previously sized glass fibers may be coated by applying the rubber adhesive composition by means of passing the sized glass fiber strands over a plurality of roller applicators placed in a bath of the aqueous coating composition. Drying of the coated glass fibers may be accomplished by passing the coated strands through a microwave oven, a forced hot air oven or through other means which impart sufficient heat to remove the water contained in the coating composition and promote the reaction of the constituents therein to effect the partial or complete cure.

A suitable formulation for the coating composition may be prepared containing the following ranges of constituents:

| Constituents | Percent by Weight |
| --- | --- |
| Polycarboxylic acid or anhydride and polyfunctional amine condensation product | 3 to 15 |
| Styrene-Butadiene-vinylpyridine rubber latex (40–60% solids) | 20 to 70 |
| Coupling agent | 0 to 5 |
| Water and ammonium hydroxide | 60 to 85 |

Although the exact structure of the condensation product is not known, it is hypothesized that this condensation product is an amide having pendant carboxyl groups. The extent of condensation is such that a low molecular weight polyamide (less than a molecular weight of 8,000) having pendant carboxyl groups which render the polymer soluble in aqueous ammonia. The procedure for synthesizing the condensation product of the polycarboxylic acid or anhydride and the polyfunctional amine is as follows:

The polycarboxylic acid or anhydride and an alcohol solvent are charged to an appropriately sized flask equipped with a heating mantle, a reflux condenser, a thermometer, a stirrer, an addition funnel, and a Dean and Star trap and stirred until homogeneous. The polyfunctional amine is then added, by means of the addition funnel, dropwise over about 2 hours while the temperature is being raised by means of the heating mantle to the refluxing temperature of the solution. After all the polyfunctional amine has been added, the solution is then continually heated while the alcohol solvent is removed by distillation. During the removal of the alcohol solvent the temperature of the reaction mixture is constantly rising due to the removal of the volatile alcohol solvent. After about 2 hours of distillation a substantial amount of the alcohol solvent is removed, and the reaction mixture is withdrawn from the heat. At this time concentrated ammonium hydroxide solution (28 percent) is added to the reaction mixture to reduce the viscosity to a desired level.

The condensation product is then prepared to be incorporated into a coating or combined sizing and coating composition.

Typical anhydrides useful in producing the condensation product are maleic anhydride, maleic anhydride copolymers and interpolymers, succinic anhydride, phthalic anhydride, chlorenic anhydride, tetrachlorophthalic anhydride and the like. Typical polycarboxylic acids useful in producing the condensation product are citric acid, oxydiethanoic acid, terephthalic acid, adipic acid, sebasic acid, azaleic acid, hydrolyzed maleic acid copolymers and interpolymeers and the like. A typical tricarboxylic monoanhydride useful in producing the condensation product is trimellitic anhydride. Typical polyfunctional amines useful in producing the condensation product are diethylene triamine, di(-triethylene) tetramine, tetraethylene pentamine, propylene diamine, ethylene diamine, bis(2 aminoethyl) sulfide, poly(oxyethylene) diamine, polymers of ethylenamine and the like.

Typical alcohols useful as solvents for the condensation reaction are methanol, ethanol, isopropanol, butanol, isobutanol and the like.

EXAMPLE I

Anhydride Polyfunctional Amine Reaction Product

To a 1 liter flask equipped with a mechanical stirrer, thermometer, an addition funnel, a reflux condenser, a variable heating mantle and a Dean and Stark trap is charged 294 grams of maleic anhydride and 400 grams of isopropanol. This mixture is heated at reflux until homogeneous at which time 238 grams of tetraethylene pentamine is added dropwise by means of a dropping funnel over a period of 1 hour and 20 minutes while maintaining the temperature of the solution at about 90° C. During the addition of the amine, the solution changed colors from tannish yellow at the beginning of the addition to dark brown at the end of the addition. After all of the polyamine was added, increased heat was applied to the reaction mixture and the isopropanol removed by distillation was begun. After 3½ hours of distillation 371 milliliters of distillate consisting of isopropanol and water were removed. At this time the pot temperature was 169° C. 120 grams of concentrated ammonium hydroxide solution (28 percent) mixed with 220 grams of water were added to the mixture after the agitation was stopped and the heating mantle was removed from the flask. Upon the addition of the above aqueous ammonia solution, the reaction mixture rapidly cooled. After this initial ammonium hydroxide water solution was added, an additional 25 grams of concentrated ammonium hydroxide and 110 grams of water was added to reduce the viscosity of the resin solution.

Coating Composition

The coating composition was prepared by mixing 30 grams of the aforementioned condensation product, 138 grams of water and 0.5 gram of ammonium persulfate until homogeneous. At which time 75 grams of styrene-butadiene-2-vinylpyridine latex (41 percent solids) was added to the coating mixture. It was noted that the compatibility of the latex was excellent in the condensation product mixture.

A sample of sized glass fiber yarn having 5 strands with a filament count of 75 was dipped in the above coating composition. The coated glass fiber yarn was cured in a 5 foot long muffle furnace at 450° F. at 5 feet per minute and impregnated with standard rubber stock used for producing tires. Typical commercial rubber compounds containing principally styrene-butadiene rubber and selected to have the following properties are used to test glass fiber properties: optimum cure at 300° F. about 30 minutes, 300 percent modulus at about 1900 pounds per square inch, tensile strength of about 2900 pounds per square inch, elongation at failure about 1.13.

The stripped adhesion for the coated glass fiber cord is determined by the following method.

A cylindrical drum was wrapped with a 4 inch by 10½ inch 40 mil thick strip of rubber stock; the rubber stock occupied substantially all the surface area of the cylindrical drum. The coated glass fiber yarn is wrapped about the rubber stock on the drum in a cylindrical fashion providing a continuous layer of yarn over the rubber stock. The wound rubber stock is removed from the cylinder and cut into a 3 inch by 10 inch sample.

A strip of 3 inch by 10 inch rubber is placed in a 3 inch by 10 inch mold and the above rubber strip with the coated strand thereon is placed in the mold with the strand side away from the first rubber strip. Two 3 inch by 1 inch strips of Holland cloth are placed at opposite ends of the strand side of the rubber strip. Another 3 inch by 10 inch rubber strip is placed over the Holland cloth and lastly a 3 inch by 10 inch rubber strip with coated strand thereon is placed on the last mentioned rubber strip with the strand side in contact with the said last mentioned rubber strip. The mold is closed and the rubber cord laminate is cured at 100 psi for 30 minutes at 300° F. The rubber cord laminate is removed from the mold and allowed to slowly cool overnight.

The laminate is cut into 5½ inch by 1 inch strips and heated for 30 minutes at 230° F. after which the Holland cloth is removed from the laminate. After setting an Instron test device for a gauge length of ½ inch to ¾ inch and callibrating the unit for a crosshead speed of 2 inches per minute, the bottom layer of the heated rubber and exposed cord are placed in the top jaw, and the top layer of the heated rubber in the bottom jaw of the test device. The Instron test device is operated until a separation of 2 inches is obtained and the loading is noted. The top layer of rubber is then inserted in the top jaw and the cord in the bottom jaw with a gauge length of ½ to ¾ inch. The Instron device is again operated until a separaion of 2 inches is obtained and the loading is noted. The test is repeated for the opposite end of the specimen and for additional specimens included in the sample. The results of the test are averaged for the adhesion of the cord to rubber. Adhesion tested in this manner on several samples ranged from 36 to 50 pounds.

EXAMPLE II

"E" glass composed of 54.4 percent by weight of $SiO_2$, 13.4 percent by weight of $Al_2O_3$, 21.7 percent by weight of CaO, 0.4 percent by weight of MgO, 8.5 percent by weight of $B_2O_3$, 0.5 percent by weight of $F_2$, 0.7 percent by weight of $Na_2O$, 0.5 percent by weight of $TiO_2$, and 0.2 percent by weight of $Fe_2O_3$ is melted at 2400° F. in an 80 percent platinum, 20 percent rhodium bushing containing orifices of 80 one thousandths of one inch in diameter. Glass fibers are then drawn by attenuating the molten glass from cones of glass at the bushing orifice to form glass fiber filaments. After the filaments are formed, they are passed over a roller applicator having on the surface thereof the coating composition (not a sizing composition) of Example I. After the sizing composition is applied, the sized filaments are gathered by means of a gathering shoe, into a strand. The strand is then passed over several roller applicators in a reservoir containing the coating composition of Example I. After the coating composition is applied, the strands are then passed through a forced air oven to cure the coated glass fiber strand. The cured coated glass fiber strand having a 30 percent weight gain, based upon the weight of the dry glass, of the sizing and coating composition is impregnated with standard rubber stock and tested for adhesion in accordance with the methods employed in Example I. The rubber articles tested in this manner have adhesions ranging between 36 and 50 pounds.

Similar results may be obtained when other polycarboxylic acid-polyamine, anhydride-polyamine, or polyanhydride-polyamine reaction products are used in lieu of the maleic anhydride-tetraethylene pentamine reaction product of Examples I and II. Also these compositions may be used as a combined sizing and coating composition in accordance with the procedures described in U.S. Pat. No. 3,718,449.

While the invention has been described with respect to details of a preferred coating composition, other formulations of the coating composition and the combined coating and sizing composition are contemplated and should be obvious in light of the specification. It is thus to be understood that the invention is not necessarily limited to the precise formulations and methods described herein except insofar as is set forth in the accompanying claims.

We claim:

1. A composition for coating glass fibers for use in reinforcing elastomeric materials consisting essentially of:
   a. water and ammonium hydroxide: 60 to 85 percent by weight;
   b. an elastomeric latex: 20 to 70 percent by weight;
   c. a condensation reaction product of
      i. a polycarboxylic acid;
      ii. an anhydride;
      iii. a polyanhydride; or
      iv. a tricarboxylic monoanhydride and
      a polyfunctional amine: 3 to 15 percent by weight; said reaction product being soluble is aqueous ammonia.

2. The coating composition of claim 1 in which said composition is a combined sizing and coating composition and includes up to 5 percent by weight of an amino silane.

3. The coating composition of claim 1 in which said composition is a combined sizing and coating composition and includes up to 5 percent by weight of a uredo silane.

4. The coating composition of claim 1 wherein said elastomeric latex is styrene-butadiene-vinyl pyridine latex.

5. Glass fibers having thereon the dried residue of the coating composition of claim 1.

* * * * *